United States Patent [19]

Kimura

[11] Patent Number: 5,093,819

[45] Date of Patent: Mar. 3, 1992

[54] SYSTEM HAVING OPTICAL DISK AND DISK DRIVE UNIT

[75] Inventor: Isao Kimura, Tokyo, Japan

[73] Assignee: Nikon Corporation, Tokyo, Japan

[21] Appl. No.: 371,010

[22] Filed: Jun. 26, 1989

[30] Foreign Application Priority Data

Jul. 4, 1988 [JP] Japan .................. 63-166474

[51] Int. Cl.⁵ .......................................... G11B 15/52
[52] U.S. Cl. .................. 369/44.26; 369/275.3; 369/48
[58] Field of Search ............... 369/30, 32, 57, 47, 369/48, 275.3, 275.4, 44.26, 43, 111, 59; 360/77.03, 77.08, 48

[56] References Cited

U.S. PATENT DOCUMENTS 4,932,014 6/1990 Tamiya .................................. 369/48
4,967,403 10/1990 Ogawa et al. ...................... 369/275.5

Primary Examiner—Roy N. Envall, Jr.
Assistant Examiner—Hung Dang
Attorney, Agent, or Firm—Shapiro and Shapiro

[57] ABSTRACT

Disclosed is an optical disk having a plurality of helical or concentric tracks to perform read/write access in units of sectors constituting each track, each of the plurality of tracks, having one or more track address areas for track seek, the remainder of the track being free format. The track address area is written with a track address signal formed in a predetermined format. The free format area is not divided into sectors but is instead formed to allow writing of data in a desired format.

6 Claims, 3 Drawing Sheets

SYSTEM HAVING OPTICAL DISK AND DISK DRIVE UNIT

BACKGROUND OF THE INVENTION

1. Field of the Invention

The present invention relates to an optical disk such as an optomagnetic disk formatted in a disk manufacturing process, a disk drive unit for performing a seek operation of the optical disk formatted in the manufacturing process, and a system having the optical disk and the disk drive unit.

2. Related Background Art

A conventional disk of the aforementioned type is formatted with specific data by a manufacturer during the disk manufacturing process, and tracks are divided in units of sectors.

A data format of an optical disk in the conventional manufacturing process is shown in FIG. 5.

Referring to FIG. 5, a track 19 includes sectors 20. In an enlarged view, each sector 20 is constituted by a sector mark 21 representing a start position of the sector, an ID portion 22 for storing a track address and a sector address, and a data portion 23 for storing user data.

In formatting during the manufacturing process, the sector mark 21 and the ID portion 22 of each sector 20 are written on the disk.

A disk drive unit for driving an optical disk formatted during the manufacturing process is designed to access sectors designated for reading/writing user data, i.e., to perform the following two operations:

(a) seek operation for moving a head to a track including the designated sector; and (b) search operation for searching for a designated sector within the track after the seek operation is performed.

To control the seek operation, a track address signal as described above is always read out during the seek operation to detect a radial position of the head.

In the search operation performed upon completion of the seek operation, sector address signals of the sectors within the track are sequentially read out to find the designated sector.

The disk drive unit for driving the optical disk formatted in the conventional manufacturing process must have an address signal reader function conforming with the disk format (i.e., a sector mark is detected, and then the address signal is read out from the ID portion after detection of the sector mark).

In addition, the conventional optical disk drive unit has a disk controller function for writing user data in the sector accessed in accordance with a specific format, and for reading out data in accordance with the write format.

The formats of some conventional optical disks are determined by manufacturers. If a user wants to change a format so as to change the number of data stored in one sector or the like, he cannot easily change do so.

In order to overcome the above inconvenience, a manufacturer may not format a disk at all, so that the user can freely format the disk. In this case, nonformatted disks are supplied to users.

In the case of nonformatted disks, since the user's format is unknown, a disk drive unit cannot incorporate a function for reading out an address signal, a function for formatting user data in a form to cause the user data to be written in the data portion, a function for accessing the data portion in accordance with the format, and a function for controlling a read/write access. A circuit having these functions must be developed as a disk controller by a user or by a joint development between the user and the manufacturer.

Therefore, the disk drive unit and disk controller must be two independent units.

In this case, the disk drive unit has only a function for writing a signal transferred from a disk controller on the basis of a write instruction from the disk controller, a function for reading out a signal from the disk in accordance with a read instruction and for transferring the read-out signal to the disk controller, and a function for moving the head to the designated track on the basis of information from the disk controller.

The disk drive unit alone cannot perform the following operations for reading out user data:

- seek operation for moving the head to the track including the designated sector;
- operation for searching for the designated sector within the track after the seek operation is completed;
- operation for accessing the data portion and transferring read-out data to the host; and
- operation for writing the formatted user data in the data portion.

As described above, seek control is always performed on the basis of the track address signal written in the ID portion of the sectors. Therefore, in order to allow a user to freely format data, the function for reading out the address signal must be incorporated in the disk controller.

The disk drive unit always transfers a signal read out from the disk to the disk controller during a seek operation. The disk drive unit causes the disk controller to read the track address signal from the transferred signal, and the address signal must be fed back to the disk drive unit, thereby controlling the seek operation.

In searching for the designated sector upon completion of the seek operation, the disk drive unit reads out the signal from the disk upon completion of the seek operation and transfers the read-out data to the disk controller. The address signal of each sector is read by the disk controller from the signal transferred from the disk drive unit and is then fed back to the disk drive unit, thereby causing the disk drive unit to find the designated sector on the basis of the fed-back address signal.

Signal transfer is also used to read/write access the data portion. After the designated sector is searched, the disk drive unit reads out a signal from the data portion in accordance with a read instruction from the disk controller and transfers the read-out signal to the disk controller. The disk drive unit writes a signal transferred from the disk controller in the data portion in accordance with a write instruction sent from the disk controller.

In the nonformatted disk system just described, because the disk controller and the disk drive unit must be independent units, as noted earlier, the track address signals required in control of a seek operation must be transferred from the disk controller to the disk drive unit through an interface circuit. As a result, a time required for a seek operation is increased, and the seek capacity is undesirably degraded.

SUMMARY OF THE INVENTION

The present invention has been made in consideration of the above-discussed problems, and has as its first object to provide an optical disk which can be freely formatted by a user while nonetheless avoiding such problems.

It is a second object of the present invention to provide a disk drive unit which does not require a disk controller in performing seek control even with a disk that can be freely formatted by a user, and which therefore does not degrade seek performance on the disk drive unit side.

In order to achieve the first object of the present invention, there is provided an optical disk having at least one track address area for storing a track address signal in each track on the surface of the optical disk, wherein the track address signal is written in the track address area during the disk manufacturing process, and the remaining area is not formatted at all.

In order to achieve the second object of the present invention, there is provided a disk drive unit for driving an optical disk in which the area except for the track address area is not formatted at all, comprising readout means for reading out the track address signal from the track address area of the optical disk and control means for controlling a seek operation on the basis of the track address signal read out by the readout means, thereby performing the seek operation on only a disk drive side.

In the optical disk having the above arrangement according to the present invention, no formatting is performed in a free format area outside the track address area during the disk manufacturing process. The user can freely format this area to form sectors and can perform read/write access of user data.

The free format area of each track is preferably divided by several track address areas. The area freely formatted by the user is thereby limited somewhat, but this does not pose a practical problem. A disk controller which performs various processing operations by the user format can be developed by the user or by a joint development between the user and the manufacturer.

According to the present invention, a track address signal reading circuit (to be referred to as a track address reader hereinafter) included in the disk driver unit reads out a track address signal from the track address area and a seek operation is controlled on the basis of the read-out track address signal.

According to the present invention, the area freely formatted by the user is not the entire area on the surface of the disk. The track address reader for controlling a seek operation assigns track addresses to part of the area of the disk. Unlike the case wherein the user can freely format the entire area of the surface of the disk, a seek operation can be performed on the disk driver side.

Even if the disk controller and the disk drive unit are arranged in separate housings for convenience, data transfer for a seek operation need not be, performed between the disk controller and the disk drive unit. Degradation of the seek capability caused by the need for data transfer control in the arrangement which allows the user to format the entire area of the surface of the disk can thus be prevented.

DETAILED DESCRIPTION OF THE PREFERRED EMBODIMENTS

Figure 1:
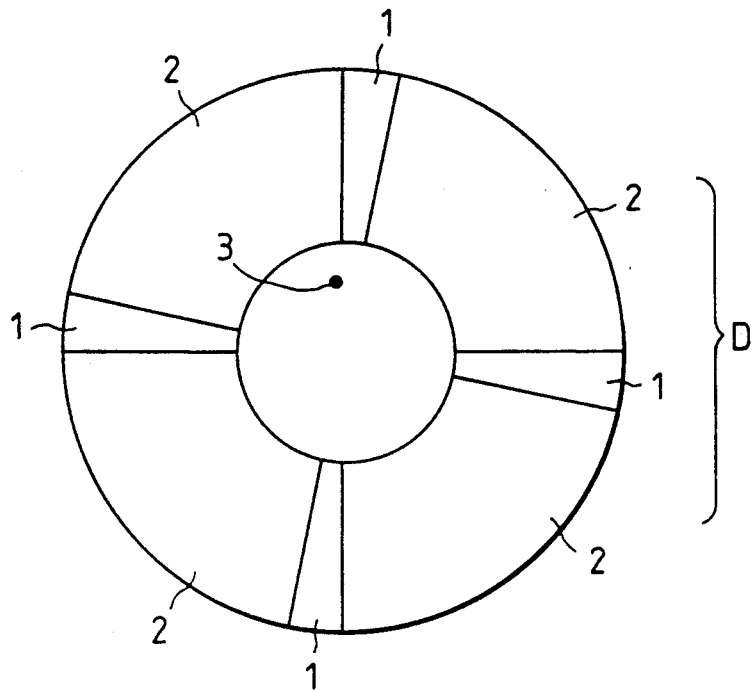
FIG. 1 is a view for explaining an embodiment of an optical disk according to the present invention.

Referring to FIG. 1, an optical disk D according to the invention includes tracks concentrically or helically formed on a disk surface. The optical disk D may be an optomagnetic disk.

Each track of the optical disk D is divided into track address areas 1 and free format areas 2. In this embodiment, the track address areas 1 are formed at equal angular intervals on the surface of the disk to define four free format areas 2. Formation of the track address areas 1 is not limited to the embodiment shown in FIG. 1. The number of track address areas per track and their angular intervals can be arbitrarily determined. The number of track address areas 1 and their angular intervals determine the number of free format areas 2 and their size.

Figure 2:
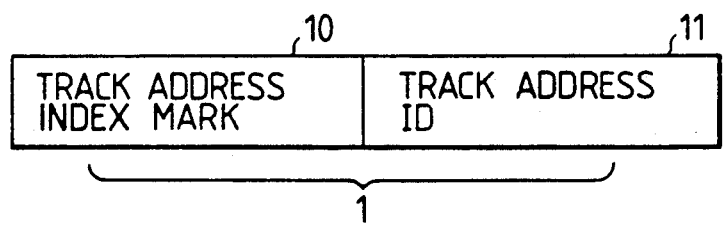
FIG. 2 is a view showing a format of a track address area of the optical disk.

Each track address area 1 formed on the optical disk D shown in FIG. 1 consists of a track address index mark 10 and a track address ID 11, as shown in FIG. 2. The format defining the track address areas is determined by the optical disk manufacturer, and the track address areas 1 are formatted in accordance with the format determined at the time of manufacture. No formatting is performed in the free format areas 2 during the manufacture. After a user purchases the disk D of the present invention, he formats the disk D in accordance with his own format, thereby defining the sectors.

Figure 3:
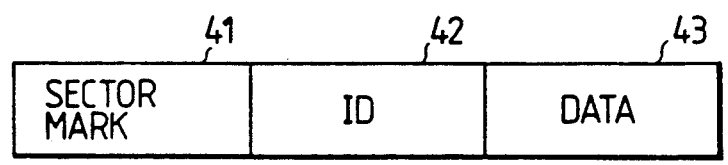
FIG. 3 is a view for explaining a format of user sectors of the free format area of the optical disk.

Each sector formed by the user format consists of a sector mark 41, an ID portion 42, and a data portion 43, as shown in FIG. 3.

Upon formatting of the disk, the sector marks 41 and the ID portions 42 are formed in all sectors, so that data read/write access of a data portion 43 can be performed.

For optical disk D formatted as described above according to the present invention, a disk controller 51 developed by the user or by a joint development between the user and the manufacturer, and a disk driver 52 perform data, read/write access. See FIG. 4.

Figure 4:
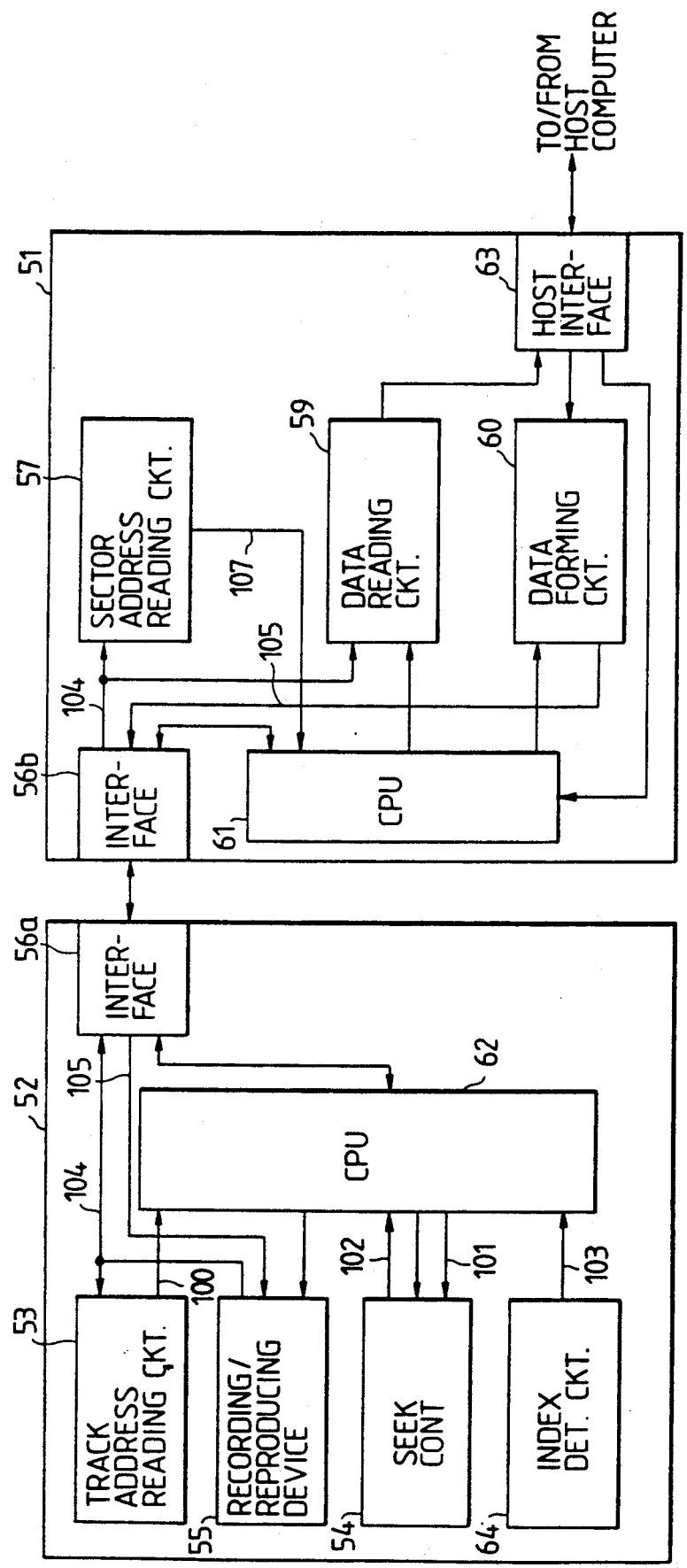
FIG. 4 is a circuit diagram showing an embodiment of a disk drive unit together with a disk controller.
Figure 5:
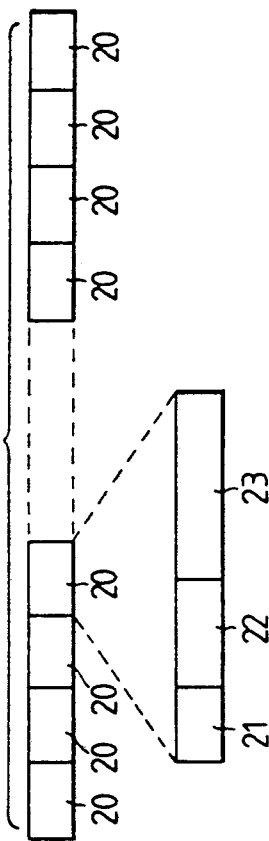
FIG. 5 is a view for explaining a format of a conventional optical disk.

In FIG. 4, the disk driver 52 includes a track address reading circuit 53, a seek control circuit 54, a recording-/reproducing device 55, a driver interface 56a, a CPU 62 having a disk drive function, and an index mark detecting circuit 64.

The disk controller 51 includes a drive interface 56b, a sector address reading circuit 57, a data reading circuit 59 including an ECC, a data forming circuit 60, a CPU 61 having a control function of a disk controller, and a host interface 63.

Read/write access by the embodiment shown in FIG. 4 will be described below.

When a read or write instruction to any sector is transferred from a host computer through the host interface 63, the CPU 61 of the disk controller 51 calculates a track address of a track including the designated sector and transmits a seek instruction and the calculated track address signal to the disk driver 52 through the drive interface 56a.

In response to the seek instruction received through the drive interface 56a, the CPU 62 of the disk driver 52 sends a read instruction to the recording/reproducing device 55 and reads out a reproduced signal 104 from a track on which the head is currently located. The reproduced signal 104 from the recording/reproducing device 55 is supplied to the track address reading circuit 53. The track address reading circuit 53 detects the track address index mark 10 (FIG. 2) from the reproduced signal 104 and then reads out a track address signal 100 of the track address ID11 following the track address index mark 10 from the reproduced signal. The track address signal 100 is output to the CPU 62.

The CPU 62 calculates a head moving amount on the basis of the track address signal 100 obtained from the track address reading circuit 53 and the destination track address signal obtained from the disk controller 51. The calculated result is output to the seek control circuit 54 as a head moving signal 101. The seek control circuit 54 causes the head to move to a destination track on the basis of the head moving signal 101. When the head reaches the target track, the seek control circuit 54 outputs a head moving end signal 102 to the CPU 62.

The CPU 62 then outputs a read instruction to the recording/reproducing device 55 again and causes the track address reading circuit 53 to obtain a track address signal 100 of a track on which the head is located. The CPU 62 compares the track address signal 100 obtained as described above with the track address of the target track which is sent from the disk controller 51.

If a coincidence is established by the CPU 62, the head has moved to the predetermined track. The CPU 62 sends a seek complete signal to the disk controller 51. However, if a coincidence is not established, head movement and read access of the track address signals are repeated until a coincidence is established.

When the seek operation is completed by the above procedures, the head is located on the track which includes the target sector. In the case of an optical disk having concentric tracks, upon rotation of the disk after the seek operation, the head will remain continuously located on the track which includes the target sector without further adjustment. In the case of an optical disk having helical tracks, however, the position of the track relative to the head will gradually change as the disk is rotated. In order to accommodate this, an index mark 3 which represents the start position of the track may be preformed on the optical disk D, as shown in FIG. 1, and an index mark detecting circuit 64 may be arranged in the disk driver 52, as shown in FIG. 4, to detect the index mark 3. After the head is located on the target track, the CPU 62 outputs an instruction for moving the head by one track inward or outward to the seek control circuit 54 every time the CPU 62 receives a detection signal 103 from the index mark detecting circuit 64. The head is thus kept located on the desired track. Inward or outward movement of the head is determined by the counterclockwise or clockwise direction of the helical track.

When the seek operation is completed, the disk controller 51 starts a search operation for the target sector.

In the search operation, after the disk controller 51 receives the seek complete signal from the disk driver 52, the CPU 61 of the disk controller 51 outputs a read instruction to the disk driver 52. In response to the read instruction, the CPU 62 of the disk driver 52 outputs the read instruction to the recording/reproducing device 55. A reproduced signal 104 output from the disk surface by the recording/reproducing device 55 in accordance with the read instruction is transferred to the disk controller 51. In response, the sector address reading circuit 57 of the disk controller 51 reads out a sector address signal 107 from the ID portion of the reproduced signal 104 and outputs the sector address signal 107 to the CPU 61. The CPU 61 compares the sector address signal 107 from the sector address reading circuit 57 with the sector address signal of the desired sector designated by the host. When a coincidence is established by the CPU 61, the search operation for the desired sector is completed.

When the search operation for the target sector is completed, the head reads out a signal located at the end point of the ID portion of the target sector. User data following the ID portion of the target sector is sent from the disk driver 52 to the disk controller 51 and read out by the data reading circuit 59. The read-out user data is transferred to the host computer through the host interface 63.

When an overwritable disk or additional writing type disk is used to write user data, the CPU 61 outputs a write instruction to the disk driver 52 and transfers a data portion signal 105 formed by the data forming circuit 60 to the disk driver 52 upon completion of the search operation.

The CPU 62 of the disk driver 52 outputs a write instruction to the recording/reproducing device 55 on the basis of the write instruction from the disk controller 51, and the data portion signal 105 transferred from the disk controller 51 is then written in the data portion of the target sector.

When an optomagnetic disk is used as the optical disk, user data write access is slightly different from that described above.

After a target sector is searched, the CPU 61 of the disk controller 51 outputs an erase instruction to cause the disk driver 52 to erase the data portion. Thereafter, the search operation for the target sector is performed again. When the head reaches the data portion of the target sector upon one revolution of the disk, the CPU 61 of the disk controller 51 transfers the data portion signal 105 to the disk driver 52 and at the same time outputs a write instruction writing the user data in the target sector.

The following two systems exemplify those which may be provided to write the sector marks 41 and the ID portions 42 for purposes of formatting the free format area of a disk according to the present invention.

1. A writing unit having a function for writing the sector portions 41 and the ID portions 42 in the free format area on the disk surface in accordance with a desired format may be provided.

Figure 6:
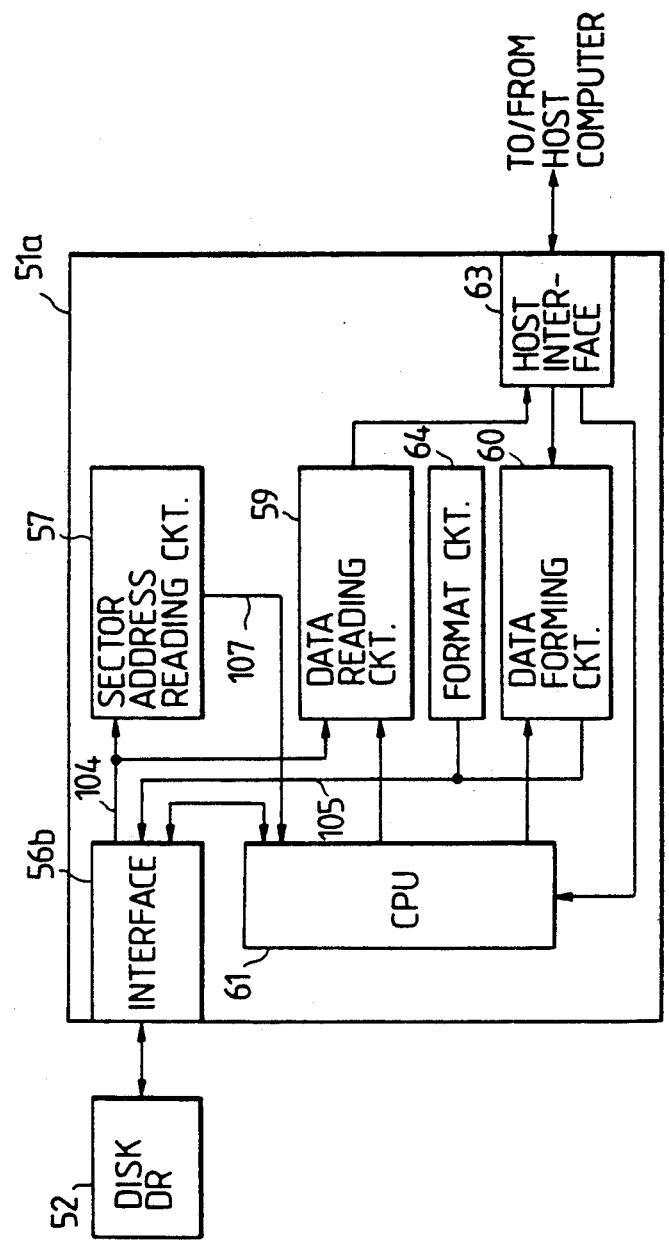
FIG. 6 is a block diagram showing part of a system according to the present invention.

2. As shown in FIG. 6, a format circuit 64 having a function for outputting a format signal to form the sectors 41 and the ID portions 42 in accordance with a desired format may be incorporated in a disk controller 51a. The disk controller 51a outputs a format signal from the format circuit 64 to the disk driver 52, and the disk driver outputs all write instructions for all the free format areas on the disk. The arrangement of the disk driver is the same as that of FIG. 4, and its illustration is omitted in FIG. 6.

According to the embodiments as have been described above, since the disk surface is not formatted except for the track address areas during the manufacture, the user can freely format the disk.

In addition, since a seek operation is controlled by reading out a track address signal from the track address area formed on the disk surface during the manufacture, a seek operation can be performed by the disk driver without receiving control from the disk controller. This avoids the problem of prolonged seek time heretofore associated with the use of nonformatted disks.

Still further, because the invention enables the seek operation to be performed by the disk driver itself, the seek operation may be tested during the manufacture of the disk driver, which is an obvious advantage in terms of quality control.

What is claimed is:

1. An optical disk having a plurality of helical or concentric tracks to perform read/write access in units of sectors constituting each track, each track including one or more track address areas for track seek each written with a track address signal in a predetermined format, the remaining area of each track being free format to allow formatting of the sectors therein as desired by a user.

2. An optical disk according to claim 1, and which is an optomagnetic disk.

3. An optical disk according to claim 1, further including an index mark represent a track-start position.

4. A disk drive unit, comprising
an optical disk having a plurality of helical or concentric tracks to perform read/write access in units of sectors constituting each track, each track including one or more track address areas for track seek each written with a track address signal in a predetermined format, the remaining area of each track being free format to allow formatting of the sectors therein as desired by a user;

readout means for reading out the track address signal from each track address area; and control means for controlling a track seek operation based on a selected track address signal read out by said readout means.

5. A disk drive unit according to claim 4, further including sector forming means for receiving data associated with the desired sector format and for forming the sectors in the free format areas of the tracks in accordance with said data.

6. A disk drive system, comprising
an optical disk having a plurality of helical or concentric tracks to perform read/write access in units of sectors constituting each track, each track including one or more track address areas for track seek each written with a track address signal in a predetermined format, the remaining area of each track being free format to allow formatting of the sectors therein as desired by a user;

readout means for reading out the track address signal from each track address area; and control means for controlling a track seek operation based on a selected track address signal read out by said readout means;

format signal generating means for generating a format signal associated with the desired sector format; and sector forming means for forming the sectors in the free format areas of the tracks based on the format signal so as to allow writing of data in said free format areas in the desired format.

* * * * *